E. H. PALMER, DEC'D.
E. M. & H. V. PALMER & W. H. ROBERTS, EXECUTORS.
CALCULATING APPARATUS.
APPLICATION FILED MAR. 2, 1906.
1,152,542.
Patented Sept. 7, 1915.
7 SHEETS—SHEET 1.
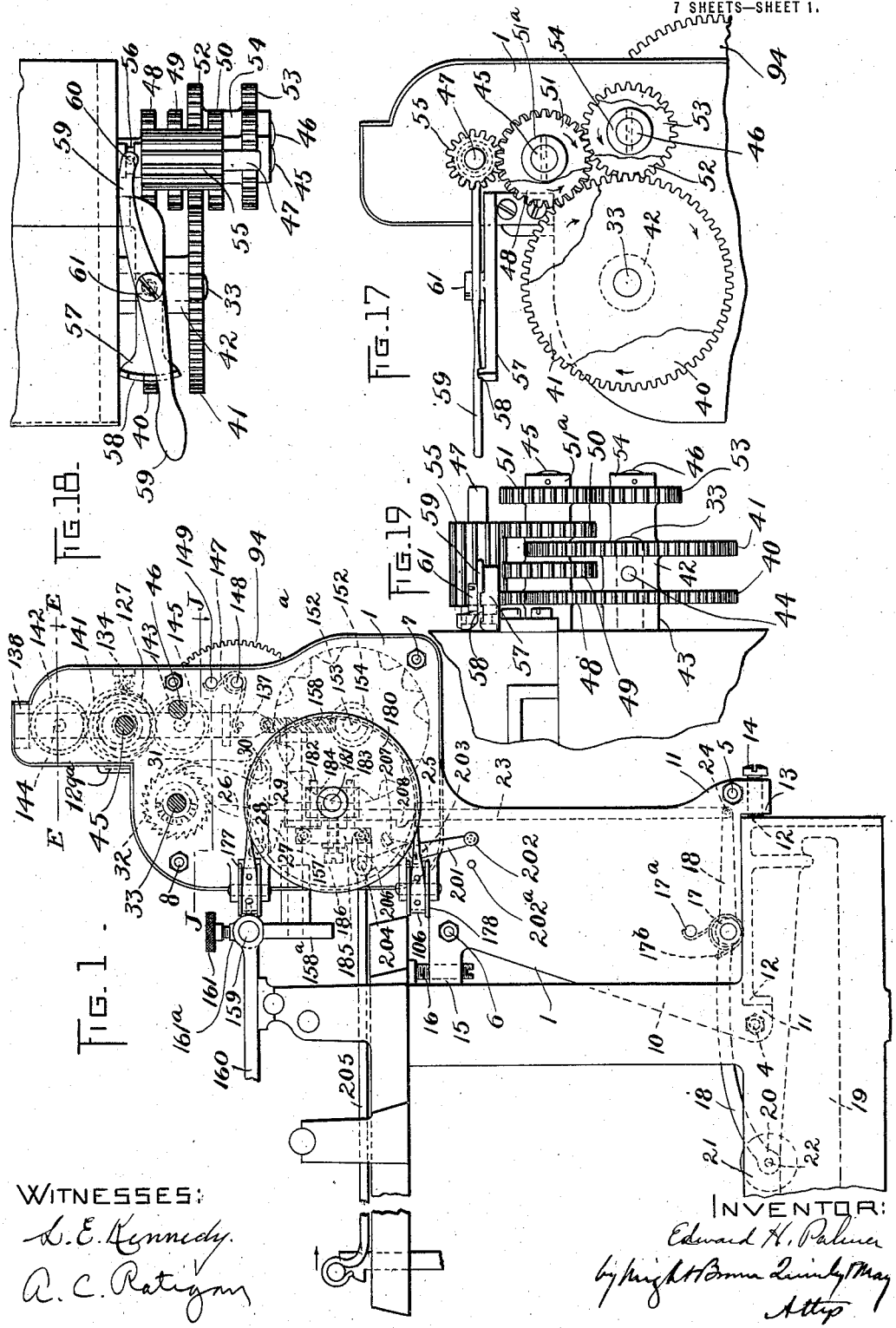
WITNESSES:
L. E. Kennedy.
A. C. Ratigan.
INVENTOR:
Edward H. Palmer
by Knight Bros Quinly May
Attys E. H. PALMER, DEC'D.
E. M. & H. V. PALMER & W. H. ROBERTS, EXECUTORS.
CALCULATING APPARATUS.
APPLICATION FILED MAR. 2, 1906.
1,152,542.
Patented Sept. 7, 1915.
7 SHEETS—SHEET 2.
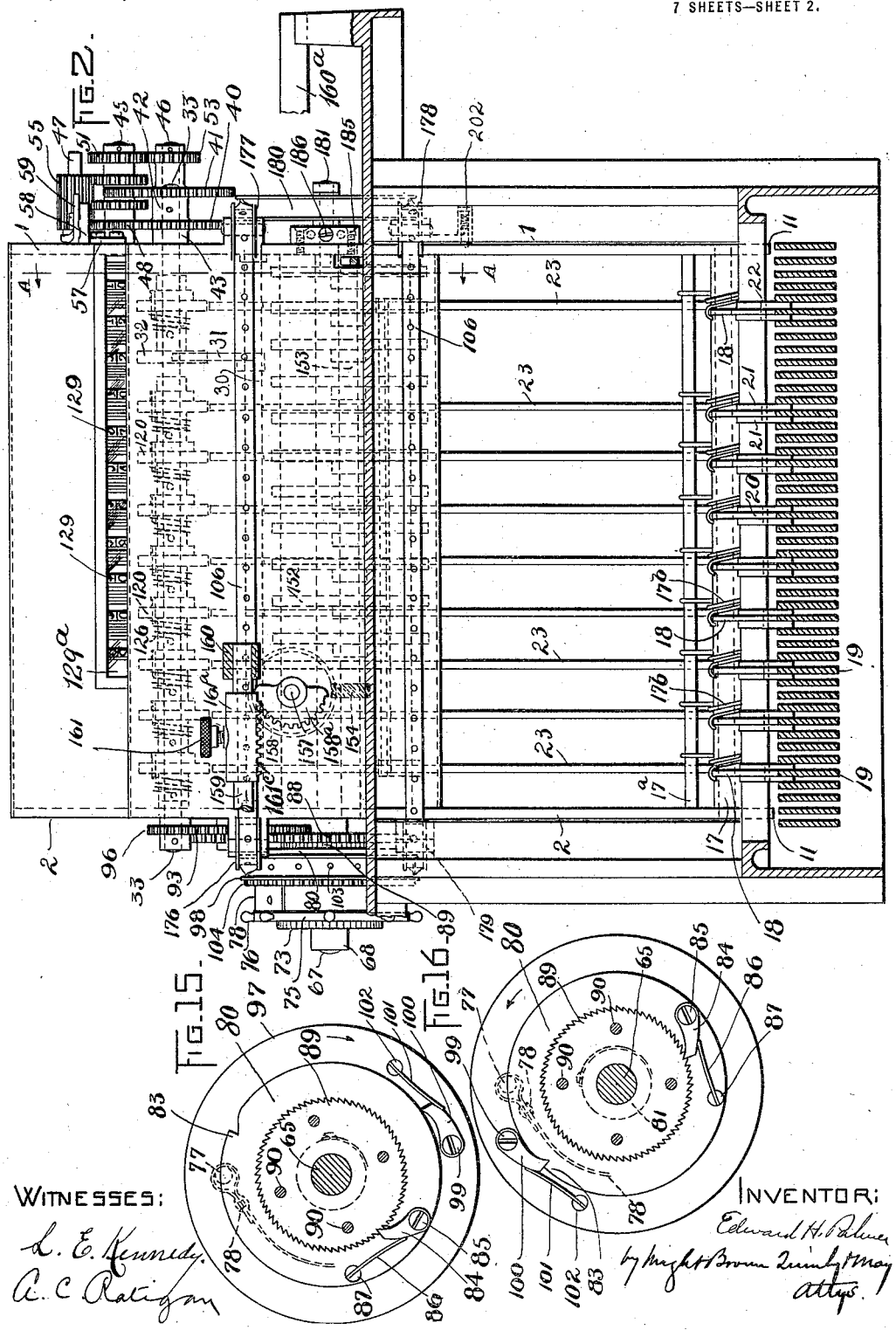

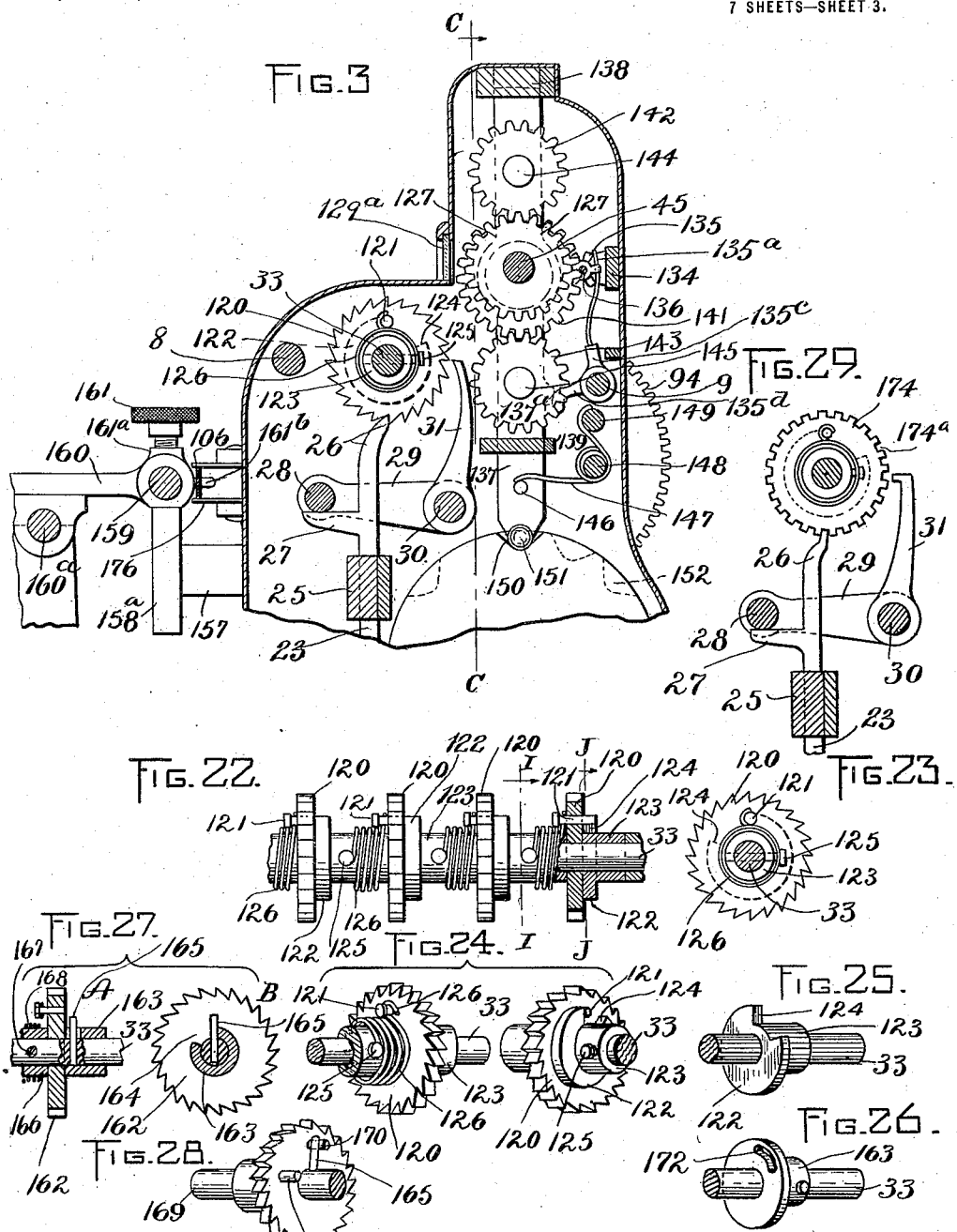

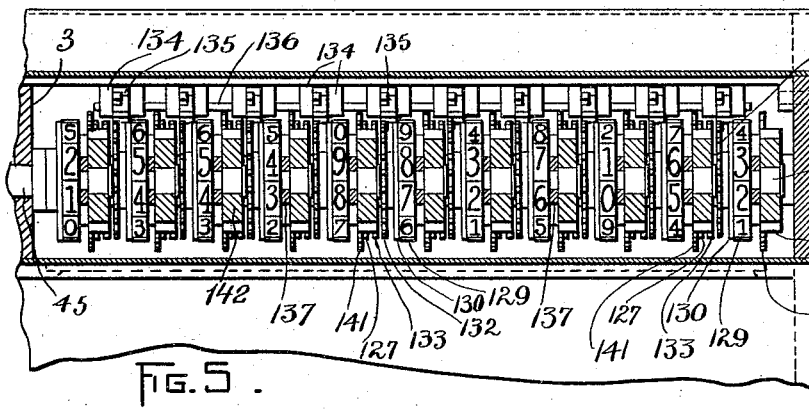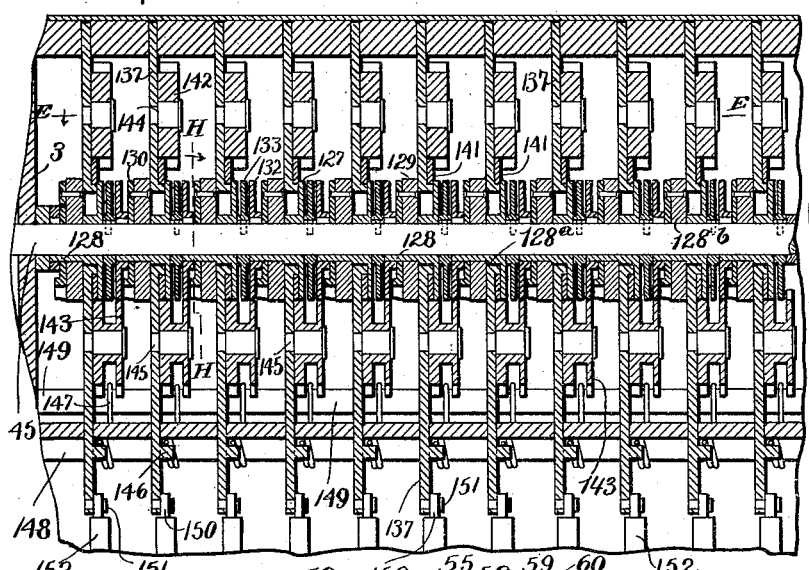

E. H. PALMER, DEC'D.
E. M. & H. V. PALMER & W. H. ROBERTS, EXECUTORS.
CALCULATING APPARATUS.
APPLICATION FILED MAR. 2, 1906.
1,152,542.
Patented Sept. 7, 1915.
7 SHEETS—SHEET 5.
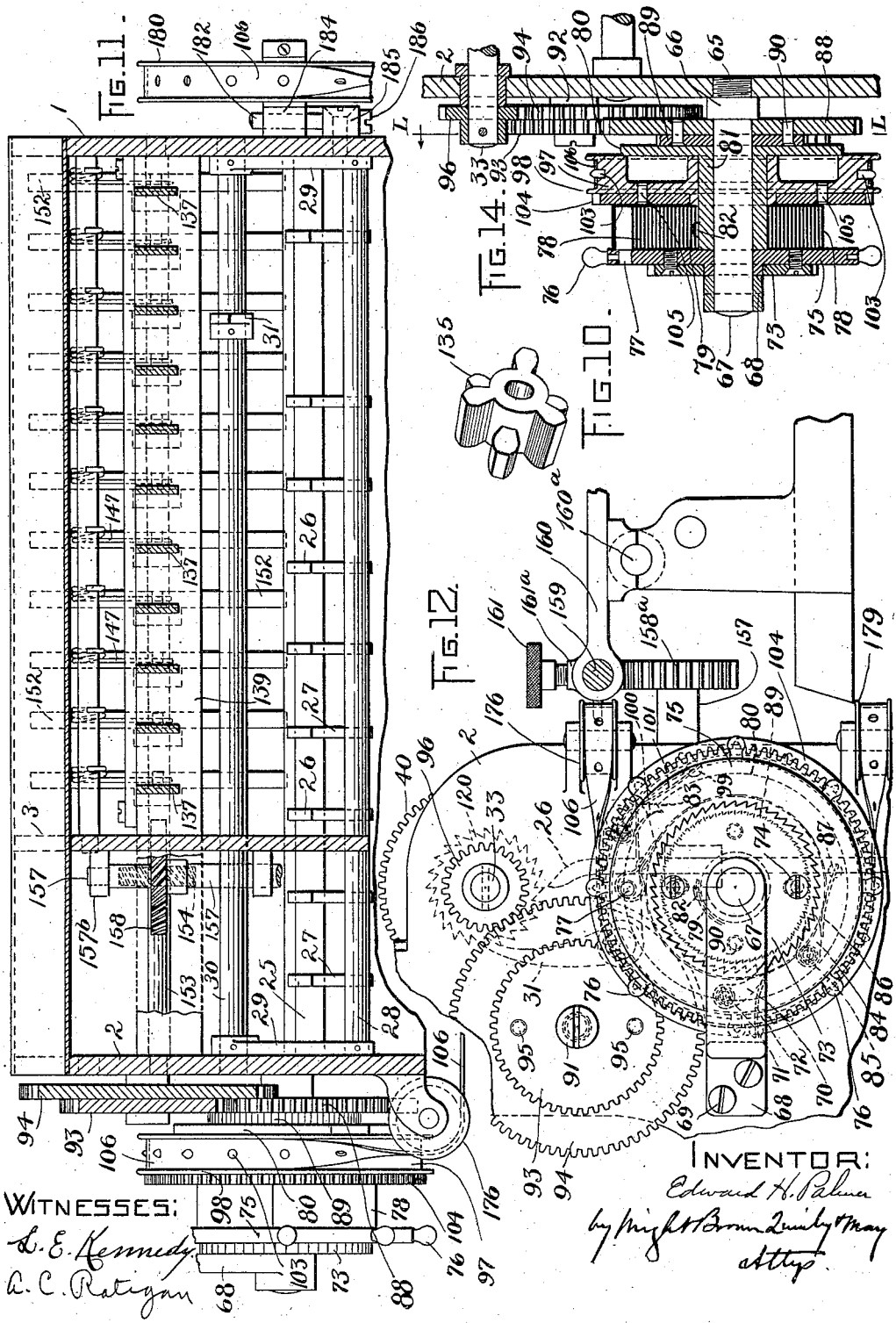

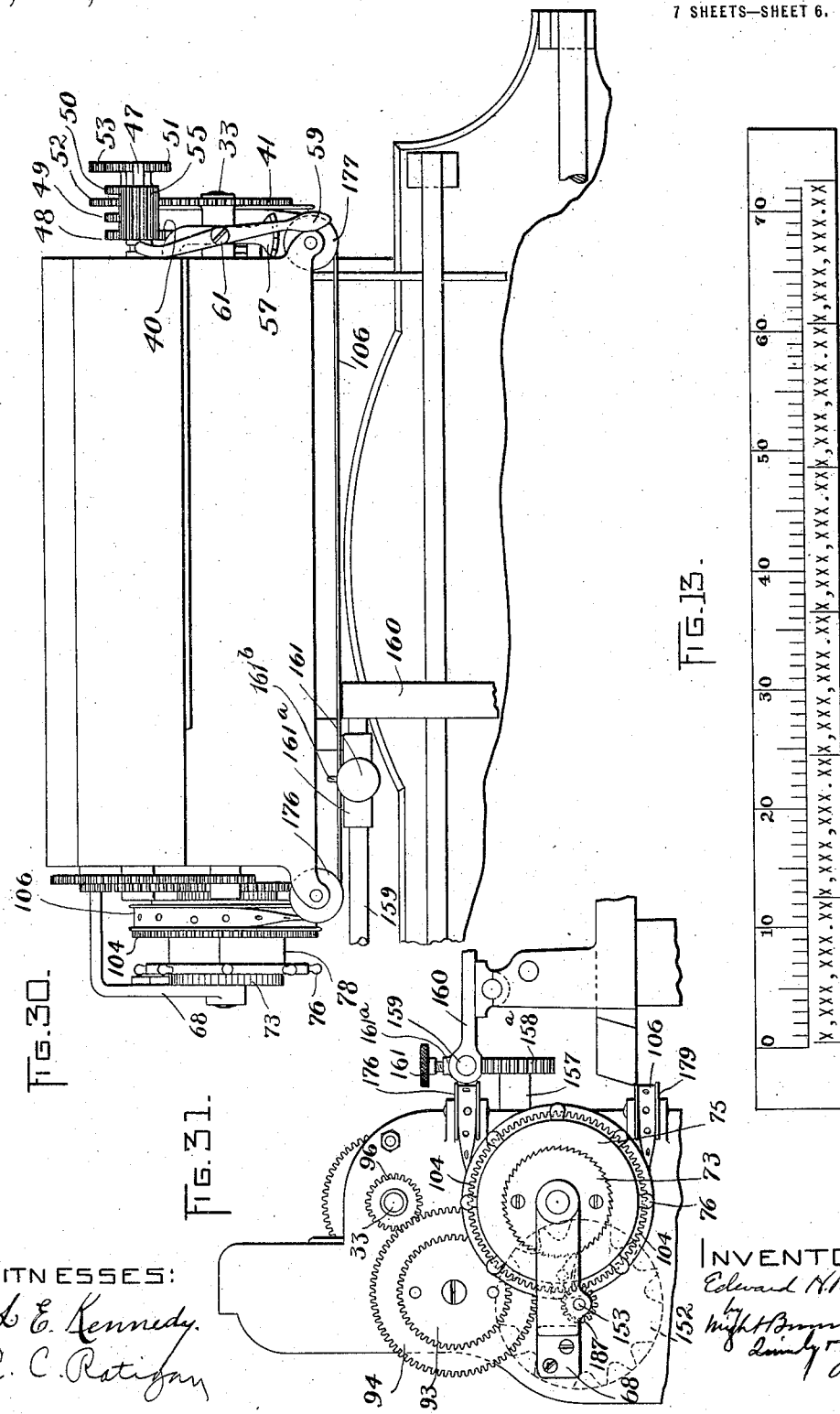

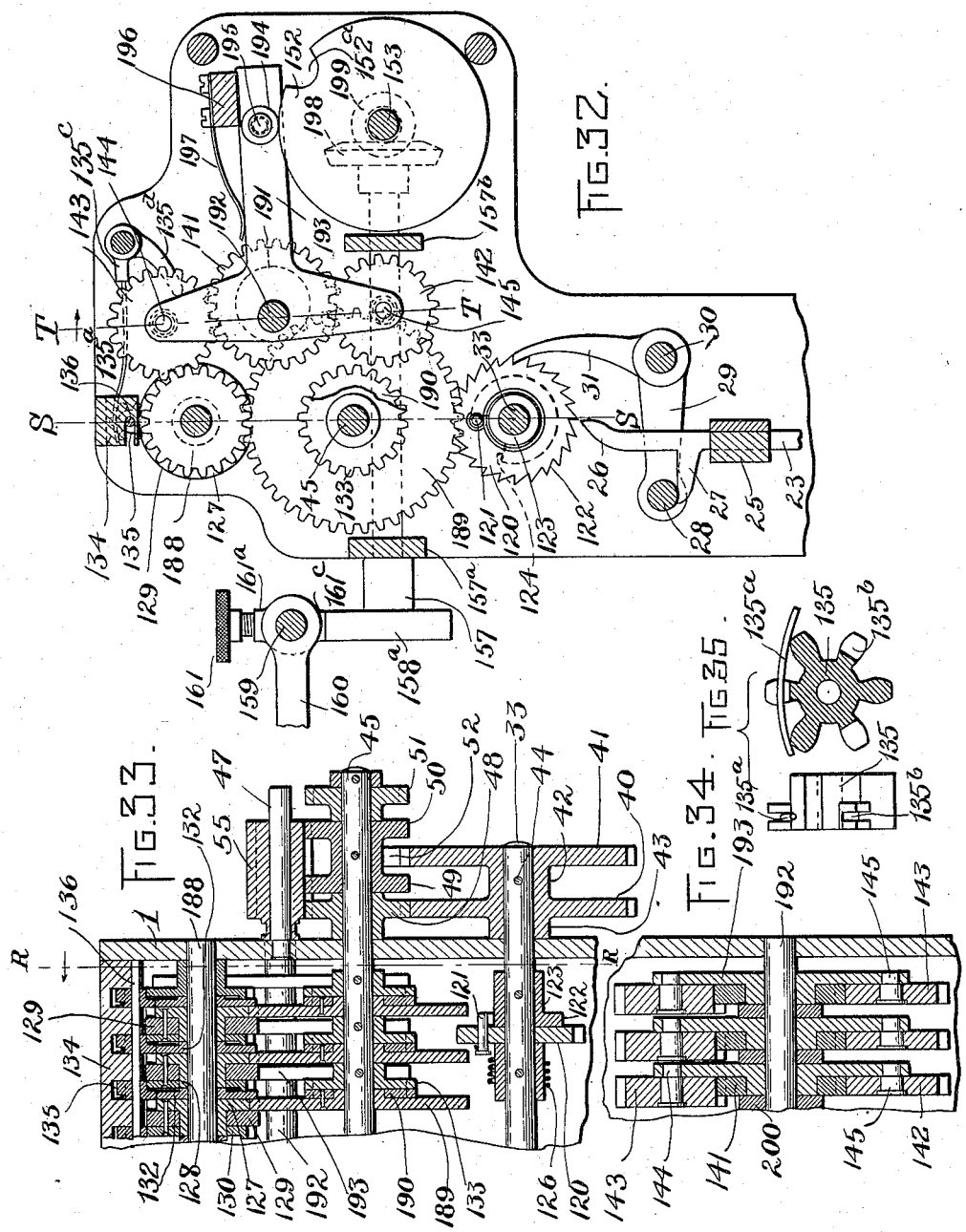

UNITED STATES PATENT OFFICE.

EDWARD H. PALMER, OF READING, MASSACHUSETTS; EMILY M. PALMER AND HAROLD V. PALMER, BOTH OF READING, MASSACHUSETTS, AND WALTER H. ROBERTS, OF MALDEN, MASSACHUSETTS, EXECUTORS OF SAID EDWARD H. PALMER, DECEASED, ASSIGNORS TO SAID EMILY M. PALMER AND HAROLD V. PALMER, INDIVIDUALLY.

CALCULATING APPARATUS.

1,152,542. Specification of Letters Patent. Patented Sept. 7, 1915.

Application filed March 2, 1906. Serial No. 303,793.

*To all whom it may concern:*

Be it known that I, EDWARD H. PALMER, of Reading, in the county of Middlesex and State of Massachusetts, have invented certain new and useful Improvements in Calculating Apparatus, of which the following is a specification.

This invention relates to mechanically operated calculating machines and consists particularly in a machine of this character adapted to be applied to a typewriter in such a manner that, when the number keys of the latter are struck to write figures in certain definite positions, the calculating apparatus will be actuated to record the figures and the sums or differences between different numbers.

The apparatus herein illustrated and described is of the same general character as the one illustrated and described in application No. 280,307, filed by me September 20, 1905.

The objects of the present machine are to provide a simple and efficient form of control by which, when the number keys are operated, the representative figure bearing members or disks may be simultaneously operated to cause registration of numbers proportional to those represented by the keys; to provide a power driver for operating the figure bearing disks and mechanism operative during the return movement of the typewriter carriage for restoring to said driver whatever power may have been expended during the previous trip of the carriage; to provide a simplified and efficient mechanism for changing the relation of driving parts so that the apparatus may be used either for addition or subtraction; to provide improved means for detachably connecting and disconnecting the several number disks with the actuator for driving, and with each other for carrying tens, such means including pinions connected so as always to enter the correct mesh with the driving and carrying pinions of the disk; and to provide an auxiliary actuator or accelerator for assisting the tens carrying mechanism and taking up back lash between the elements thereof.

The details of construction of an apparatus embodying my invention and the features of novelty thereof are illustrated in the accompanying drawings wherein,—

Figure 1 represents a side elevation of an embodiment of the invention as applied to a typewriting machine of the type known as the "Remington No. 7," sufficient of the typewriting machine being shown in dotted lines to indicate the manner of connecting the calculating mechanism thereto as viewed from a line A—A, Fig. 2. Fig. 2 represents a front elevation of the calculating mechanism, a portion of the typewriting machine also being shown in section. Fig. 3 represents a cross section of the calculating mechanism on an enlarged scale. Fig. 4 represents that portion of Fig. 3, at the right of the line C—C, with dotted lines added showing the form of the vertical slide which carries the connecting and annular idler wheels. Fig. 5 represents a front view in section at line D—D of Fig. 4. Fig. 6 represents a plan view of Fig. 5 at line E—E of Fig. 5, and at the line E—E of Fig. 1. Fig. 7 represents a fragmentary sectional plan view on line G of Fig. 4, omitting the vertical slides and annular idler wheels. Fig. 8 represents a view of the disk and two projecting carrying teeth on the left hand side of each of the number wheels, as viewed from line H of Fig. 5, also showing in section the right hand end of the carrying wheel. Fig. 9 represents a view of Fig. 8 from the right, looking to the left, showing the disk cut away and the left hand end of the carrying wheel meshing with a pinion, loosely mounted on the hub of the disk. Fig. 10 represents a perspective view of one of the carrying pinions or carrying wheels, which communicate motion from one of the number wheels to the loosely mounted wheels on the hub of the disk, and, when connected, by means of a connecting wheel, to the adjacent number wheels at the left. Fig. 11 represents a sectional plan view from line J—J on Fig. 1, also a plan view of the power spring and gear connections up to the gear on the control shaft. Fig. 12 represents an enlarged view, from the left hand end, of the power spring and its gear connections to the control shaft, being an end view of Fig. 11, with dotted lines showing a portion of the mechanism to show their relative position. Fig. 13 represents the ordinary form of indicator on a Remington typewriting machine, with a guide as to position of columns in which figures are to be written. Fig. 14 represents sectional view of the power spring and rewinding mechanism, operated by the return of the typewriter carriage. Figs. 15 and 16 represent different positions of the power-flanged spool, looking from the right to the left on line L of Fig. 14. Fig. 17 represents an enlarged view of the gearing connecting the control shaft with the number wheel shaft and means for reversing its rotation for subtraction, as seen from the right looking to the left of Fig. 2. Fig. 18 represents a plan view of the same. Fig. 19 represents a front view of the same, enlarged. Fig. 20 represents a rear view, partly in section, of the same, the gearing being connected for rotating the number wheel shaft for addition. Fig. 21 represents the same, the gearing being connected for rotating the number wheel shaft for subtraction. Fig. 22 represents a portion of the control shaft, with control ratchets, also fixed collars with extended sleeves, partly in section, together with coiled springs, mounted thereon. Fig. 23 represents an end view of Fig. 22, looking from left to right, showing position of the ratchet wheel as it is nominally at rest on the control shaft, from line I, Fig. 22. Fig. 24 represents two perspective views of one of the control ratchet wheels and adjacent fixed collars, sleeves and coiled springs; the view at the left being from line I Fig. 22, looking to the right, that at the right being a view from line I Fig. 22 looking to the left. Fig. 25 represents a perspective view of the fixed collar-member of the control mechanism, with the segment removed from its rim and the extension sleeve, as viewed from line J Fig. 22 looking to the right. Fig. 26 represents a modification of Fig. 25, showing a curved slot instead of the removed segment as in Fig. 25. Fig. 27 represents a simple modification of the control mechanism, A being a view in section, B being an end view of A looking to the left. Fig. 28 represents a simpler form of the control mechanism, doing away with the fixed collar and sleeve and substituting a simple pin fixed in the shaft, with two pins driven into the side of the ratchet control wheel. Fig. 29 represents a control wheel having square cut teeth instead of ratchet form, the single upright pawl fixed on the escape-lever and a part of the vertical toothed rod to intercept its rotation; this form of teeth being required if the control be on the same shaft with the number wheels, in order to restrain its rotation in either direction. Fig. 30 represents a plan view of the calculating mechanism also sufficient lines of the rear of the typewriting machine to show its position, with a view of the spring power at the left, the connecting mechanism from the control to the number wheels and reversing mechanism at the right, the steel endless tape, and the connection between the steel tape and the carriage. Fig. 31 represents a view of Fig. 30 from the left, showing the steel tape connecting the carriage to the rewinding ring, also a pinion mounted on the left hand projecting end of the cam shaft meshing with the rewinding ring pinion, being a method of rotating the cam shaft by the traverse of the typewriter carriage where several columns of figures are required to be written. Fig. 32 represents a side view from the right, at line R—R of Fig. 33 showing a modified construction. Fig. 33 represents a sectional front view of Fig. 32 at line S—S of Fig. 32. Fig. 34 represents a sectional front view of Fig. 32 at line T—T of Fig. 32 showing the parts directly in the rear of those shown in Fig. 33. Fig. 35 represents an elevation and a sectional view of a modified construction of carrying pinion with a restraining and accelerating actuator in operative relation therewith.

The same reference characters indicate the same parts in all the figures.

This calculating mechanism may be applied to any typewriting machine by making slight adaptations and modifications in the frame and connections suitable for the particular machine from the construction and arrangement here shown, which is particularly adapted to the "Remington No. 7," but in any case the essentials are the same.

In the embodiment here shown, the apparatus comprises main side frame plates 1—2 connected together by suitable transverse rods 4—5—6—7—8—9 and various shafts hereinafter described, which support parts of the mechanism. This mechanism and the frame plates are compactly and securely held together, constituting a separate independent device which may be operated independently, and has also capabilities of attachment to the frame of a typewriting machine. For the purpose of such attachment, the lower portion of the frame plates 1—2 are widened (see Fig. 1) and have forwardly-projecting arms 10, also downwardly projecting lugs 11—13 adapted to embrace and engage the forward and rear edges of the table projection 12 of a typewriting machine. In the projections 13, are adjustable set-screws 14, adapted to be screwed up against the rear of table 12 to clamp the calculating mechanism to the machine. There are also formed upon the side plates projections 15 carrying set-screws 16, arranged to engage the upper part of the typewriting machine. By means of these projections and screws, the calculating mechanism may be securely and firmly attached to the typewriter in a way which also permits ready disconnection therefrom.

Mounted in the forward ends of arms 10 is a transverse rod or shaft 17 on which are pivotally mounted levers 18, (Figs. 1 and 2) there being nine of such levers, each of which is adapted to rest its forward end 20 on one of the number-key levers 19 of the typewriting machine. Springs 17$^b$ surround the rod 17 and bear against a second transverse rod 17$^a$ fixed in the side frames, their forward ends pressing the forward ends of the levers 18 downward when the number-key is depressed, but the springs are not of sufficient power to depress the number-key levers or to prevent their upward return to their normal position.

At the forward end of each lever 18, on either side, are two thin disks 21 mounted loosely on pin 22 which passes through the end of lever 18 at 20. These disks project downward each side of the number-key levers 19 as guides, to prevent lateral motion of levers 18 and keep them in place. At the rear end of each lever 18, pivotally connected at 24, is a vertical rod 23 which extends upward through two guide rails 25, said rails being transversely mounted in the side frames. The vertical rods 23, near their upper ends, carry arms 27 projecting forward, Figs. 1, 3 and 32, each of which is designed to contact with a transverse rod 28, which is carried by the movable arms 29 fixedly mounted near the ends of a transverse rock-shaft 30, journaled in the side frames 1—2 to allow a rocking motion. At the extreme upper end of vertical rod 23 there is a pointed tooth or detent 26. The slightest upward motion of the vertical rod 23 causes the detent 26 to enter the ratchet tooth of one of the control ratchet-wheels 120 thereby restraining it from rotation.

The number keys of a Remington No. 7 machine are situated on the upper row of keys, commencing at the figure 2 and continuing in regular order to the right, about ¾ of an inch apart, until the figure 9 is reached. The figure 1 is situated in the same row of keys but is nearly an inch and a half to the right of the number 9, thus the space between the figure 9 and the figure 1 is double that of the other numbers. Directly opposite this space, fixedly mounted on the transverse shaft 30 is an upright pawl or detent 31, designed to contact with the teeth of a 24 tooth ratchet wheel 32 (Fig. 2), said wheel being firmly pinned to the control shaft 33. The upright pawl 31, while in contact with the teeth of the fixed ratchet wheel 32, restrains the control shaft 33 from rotating.

Over each of the number key levers 19 is a lever 18, connected to a vertical rod 23, and on the control shaft 33, opposite each vertical rod is loosely mounted a 24 tooth ratchet wheel 120 for the purpose of limiting the motion of the rotation of the control shaft. Transversely extending through each of these control ratchet wheels 120 is a small rod or pin 121, its ends projecting from each side of the wheel (Figs. 3, and 22—28).

Fixedly mounted on control shaft 33, beside each of the loosely mounted ratchet wheels, is a disk 122 having a sleeve or hub of smaller diameter 123, which extends to the right far enough so that its end forms a collar to hold the ratchet wheel closely against the next disk but allowing it to turn freely. In the disks 122, with the radius of the pins 121, there is a segmental portion cut out, which, in the disk corresponding to the number 1 key, has a circumferential length of 1/24th plus the diameter of the pin, and increases in the successive disks by regular and equal amounts up to 9/24ths plus the diameter of the pin, which is the length of the recess in the disk corresponding to the number 9 key, and, as the pin 121 is radially between the faces of the removed segment, the rotary motion of the disk and shaft (when the rotation of the ratchet wheel is prevented) is limited to one or more twenty-fourths of one rotation. Thus, the shaft, when controlled by a number key of higher value than the number-one key, is enabled to travel through a distance which is an exact multiple of that through which it turns when governed by the number-one key, and is as many times greater than that distance as the number of the particular controlling key is greater than one. Fixed to each of the sleeves 123, over a projecting pin 125, which passes through the sleeve and the control shaft, is a coiled spring 126, one of its ends being held by the pin 125, the other passing behind the pin 121 in the ratchet wheel. Each spring tends to revolve the ratchet with which it is engaged forward toward the points of its teeth, so far as the segmental cut in the disk 122 at its right will allow it to rotate. The faces 124 and pins 121 constitute stops limiting the relative movement of the shaft and loose ratchets, while the springs 126 tend to retain the latter at one of the limits of their relative movement. The impulse of a power spring through pinion wheels, gearing with a fixed gear 96, on the left hand end of the control shaft (which will be later explained) causes the control shaft 33, whenever it is permitted, to rotate in the direction in which the ratchet teeth point. Thus, if a fixed detent is inserted into one of the ratchet teeth and the control shaft is allowed to rotate, by withdrawing the upright pawl 31 from contact with the fixed ratchet wheel 32, the control shaft 33 will turn as many 24ths, or other fractional parts of a rotation, depending on the number of teeth on the ratchets, as the ratchet wheel selected permits, according to the size of the segmental cut in the disk at its right limiting its rotation.

Upon the depression of any number key, the front end of the particular lever 18, engaged therewith, falls, thereby raising its rear end and with it the connected vertical rod 23. Its point 26 enters the tooth of one of the control ratchet wheels, thereby restraining its motion. The further upward motion of the vertical rod 23, through the arm 27 contacting with the transverse rod 28, lifts the arms 29, thereby rocking the shaft 30, and rocking the pawl 31 backward and out of connection with the fixed ratchet wheel 32, thereby allowing the control shaft, from its rotary impulse from the power spring, to rotate as far as the pin 121 allows the particular disk 122 at its side to turn, that is, until the rear shoulder 124 of the segmental recess in the disk strikes the pin, and the disk 122 being pinned to the shaft, it thereby limits the rotary motion of the shaft to either of the desired number of twenty-fourths according to the ratchet wheel selected. Upon the rise of the number key, the vertical rod descends allowing the upright pawl 31 to engage in the fixed ratchet wheel 32, after which the point of the rod drops below the teeth of the loosely mounted ratchet wheel, allowing it to revolve forward by the impulse of spring 126, as its teeth point, until its projecting pin is against the opposite or forward side of the segmental cut in the next right hand fixed disk, thereby being ready to arrest the rotation of that disk again whenever the motion of that particular loosely mounted ratchet wheel is restrained and the shaft released. It will be noted that, when the control shaft rotates, all the loosely mounted ratchet wheels revolve with it, except one which is restrained, but they are each by means of the coiled springs 126 pressed forward toward the points of their teeth against the forward part of the segmental cut in the respective next right hand disk, ready to limit the rotatable movement if held stationary by interposing a fixed tooth in any of their teeth, and that, as the fractional rotation of the control shaft is always a whole number of twenty-fourths, there is always a tooth on every control ratchet exactly in position to receive the point of the vertical upright rod.

The rotation of the shaft and disks is wholly in one and the same direction, and that of the shaft alternates with that of the disks, the shaft being allowed to turn when any disk is held fast, and the disk turning when released by disengagement therefrom of its respective rod 23, the shaft being then held stationary.

To further illustrate this control a simpler form thereof is shown in Fig. 27, A being a front view in section, B a side view of A at the right. The control ratchet is here shown as loosely mounted on the control shaft 33, having a hub 163 extending to the right. Out of this hub 163 is cut a recess 164 and fixed through the shaft is a pin 165. The pin prevents the control ratchet 162 from moving laterally to the right on the shaft. A collar 166 is fixed on the shaft by a set screw 167, which prevents any lateral movement of the control ratchet on the shaft to the left, but allows it to rotate freely as far as the pin will allow. The coiled wire spring 168, held at one end in the collar, passes around and upward behind a horizontal pin 169, fixed in the side of the ratchet wheel, normally keeping one radial face of the remaining portion of the hub 163 (formed by the removed sector) against the pin 165. If, by the interposition of a detent as of the end of the upright rod 23 in any one of its teeth, its rotation is restrained, and while so restrained the escape pawl 31 is rocked out of contact with the one escape ratchet wheel 32 fixed on the control shaft 33, said shaft, by the impulse derived from the spring, will rotate just so far as the size of the removed sector less the diameter of the pin 165, and as each of the nine hubs has a sector removed of different lengths circumferentially, from one twenty-fourth to nine twenty-fourths plus the diameter of the pins, the rotation of the shaft is thus limited from one to nine twenty-fourths. The control shaft having a fixed pinion of 24, or a multiple of 24 teeth, its rotation causes other pinions in mesh to rotate from one to nine twenty-fourths in proportional parts.

Fig. 28 illustrates a still more simple form, having two pins 170 171 driven into the side of the control ratchet at different distances apart circumferentially of from one to nine parts, the pin 165 fixed in shaft 33 being long enough to contact with them and the same result will be obtained as before described, or a single pin in the side of the control ratchet may project through a slot 172 in an adjacent fixed collar as shown in Fig. 26, or conversely a slot may be formed in the ratchet wheel and a pin fixed in the collar, these being simple modifications of this form of control.

In Fig. 29, the control wheel 174 is shown with teeth 174$^a$ in its face 175 cut square with square intermediate notches, instead of tapered teeth and notches as in the ratchet form, thus designed to permit its rotation in either direction, in case it is desired to put the control mechanism and the number wheels on the same shaft, in a position such as in front of the typewriting machine and back of the number-keys where lack of space requires compact mechanism. I consider this form of control, carried wholly by its own shaft, free from friction of any contacting parts, and always in position for operation with its positive action, to be an important part of my invention and wholly new. The ratchet wheels 32 and 120 constitute escape devices controlled by the several manually operated levers 18 and the typewriter number keys, which allow the drive shaft 33 to escape when any number key is operated and to turn through distances proportional to the values of the numbers represented by the several keys.

The end of the control shaft 33, journaled in the side frame 1, passes through said frame to the right (see Figs. 2, 17–21 and 33). Fixedly mounted upon this extended end are two pinions 40 and 41, each having 72 teeth or a multiple of the teeth in the control ratchet wheels. These pinions are connected by a sleeve or hub 42, and, between these wheels and the side frame on shaft 33, is a collar or sleeve 43. The hub 42 has a set screw 44 which fixes it on the shaft 33. Above and to the rear of the control shaft, parallel thereto, is the number wheel shaft 45, journaled at the right in side frame 1 and at the left in a frame 3, (Figs. 5 and 6) this frame being supported on the connecting rods 6—7—8—9 which extend laterally across the mechanism from side frame 1 to 2. Below and to the rear of shaft 45 is a stud 46, on which the reversing spool pinions, each having 30 teeth (the one to the left being designated by 52 and the one to the right by 53) are loosely mounted. On the number wheel shaft extension 45, commencing at the left next to the side frame, is loosely mounted pinion 48 having 30 teeth, at its right are fixedly mounted two pinions connected by a sleeve, each having 30 teeth (the one at the left being designated by 49 and the one at the right by 50). At the right of these is a loosely mounted pinion 51 having 30 teeth, and to the right of this a collar 51ᵃ is pinned to the shaft to prevent lateral motion but unconnected therewith so that the loosely mounted wheels may rotate freely. The rotation of the control shaft 33, on which are fixed pinions 40 and 41, is to the right, Fig. 17. Pinion 40 meshes with loosely mounted pinion 48, causing it to rotate to the left. Pinion 41 meshes with the spool pinion 52, mounted on the stud 46, causing it to rotate to the left, and its being connected to pinion 53 by a sleeve, that is also caused to rotate to the left. Pinion 53, on the stud 46 rotating to the left, meshes with the loosely mounted pinion 51, causing it to rotate to the right. Thus, the two loosely mounted pinions 48 and 51 on the shaft 45, one at the left and one at the right of fixed pinions 49 and 50, are rotated at each movement of the control shaft three teeth, or one-tenth of their whole rotation, for each twenty-fourth of one rotation of the control shaft and in opposite directions.

Directly above the shaft 45 is a stud 47, projecting from the side frame 1, on which is slidably mounted a long pinion 55, in a position to mesh with the fixed pinions 49 50 and either of the flanking loose pinions on shaft 45. It has at its ends a cylindrical projection, in which is cut an annular groove 56. Projecting from the side frame and securely fixed thereto is a bracket 57 having a flat top, in forward end of which is a raised segment 58, having two slots cut therein, for the purpose of holding the forward end of a movable lever 59 in one of two different positions. The lever 59 is mounted, so that it may move laterally, on a stud screw 61 screwed into the top of bracket 57. At the rear end of this lever is fixed a pin 60, projecting downward and entering the groove 56, in the projection of the long pinion 55. The position of the lever, as shown in Figs. 18—19—20, shows the long pinion 55, in position to connect the pinions 49 and 50, which are fixed on shaft 45, with pinion 48, which at each escape of the control shaft, rotates to the left. The position of the lever, as shown in rear view, Fig. 21, shows the long pinion 55 in position to connect the pinions 49 and 50, which are fixed on shaft 45, with the pinion 51, which, at each escape of the control shaft, rotates to the right. By shifting the pinion 55 into either of these positions, the number disk shaft 45 may be rotated in either direction from the control shaft 33, and the disks thus moved one way or the other, according as addition or subtraction is to be performed.

*Power spring.*—A stud 65, (Fig. 14) screwed into side frame 2 up to a solid shoulder 66, projects therefrom to the left, its outward end 67 being supported in the end of a bracket 68, (Figs. 2 and 12) which is firmly fastened to the side frame 2, and has an arm projecting to the left, in a direction at right angles to its base, and another arm projecting forward, in the direction of a right angle from the first mentioned arm, to a suitable position to support the stud end 67 rigidly. Mounted loosely on stud 65—67 at the extreme left, is a disk 75, having knobs 76, projecting from its rim, to permit of its rotation by the hand; it also carries a ratchet wheel 73, mounted on the left upon the disk hub and firmly fixed to the disk by screws 74. A pawl 70 is mounted on a pin 71 on the inside or right hand side of the forward projecting arm of the bracket 68, in suitable position so that the spring 72, pressing it in contact with the ratchet wheel 73, prevents rotary motion of the latter except to the left, or in a backward direction. Projecting from the right hand side of the disk 75 is a pin 77, upon which the outside loop end of a flat coiled spring 78 is held. In the inside end of the coiled spring 78 is a hole 79, which is caught over a hook 82, fixed in the left hand end of the sleeve 81 which projects to the left from a disk 80. The disk 80 and connected sleeve 81 are loosely mounted on stud 67. The disk 80 (Figs. 15 and 16) carries on its right hand side a pawl 84 which is held in contact with a ratchet wheel 89, by means of a spring 86, which is held by a small stud 87 on the same face of the disk. The ratchet wheel 89 is fixed to a pinion 88 having 72 teeth, by means of pins 90. There is one ratchet tooth 83, cut in the rim of disk 80 for the purpose of rewinding the coiled spring and restoring the power expended, as will be later described. The power gear 88 meshes with a pinion 93 of 48 teeth, said pinion being fixed to a pinion 94 by pins 95, these pinions 93—94 being loosely mounted on a stud 92 fixed in side frame 2. The pinion 94 meshes with pinion 96, which is mounted and pinned on the control shaft 33. On rotating the disk 75, by means of the knobs 76, the pin 77 carries the outer end of the coiled spring to the left (Fig. 12) causing its inner end, from the impluse thus given, to exert a rotary force on the sleeve 81 and disk 80, which latter, by its pawl 84 contacting with ratchet wheel 89 on the side of pinion 88 and through pinions 93—94—96, provides a rotary impulse to the control shaft 33, causing it to rotate whenever the upright pawl 31 is disengaged from the escape wheel 32, (Fig. 2) and through the fixed pinions 40 and 41 thereon, to turn the number-wheel shaft 45.

*Rewinding mechanism.*—Mounted loosely on sleeve 81, between the spring 78 and the disk 80, is a rewinding ring or drum 97, (Fig. 14) having a rim 98 projecting beyond its face at each of its sides as guides to keep from lateral movement an endless steel tape which it carries. The face of the ring also has projecting pointed pins 103, at proper spaces to engage in small holes in the steel tape 106, in order that the tape may rotate the ring. The rewinding ring carries at its right hand side a pawl 100, (Figs. 15 and 16) pivotally mounted on screw 99 and this pawl is held in contact with the face of the rim of the disk 80, which as before stated has a single ratchet tooth, by means of a spring 101, mounted in a small stud 102, fixed in the side of the rewinding ring. At the left hand side of the rewinding drum there is fixed a 78 toothed pinion 104, its purpose to be described later.

Loosely mounted on vertical pivots, held in the side frame 2, (Fig. 2) are two horizontal rollers 176 and 179, each having flanges on the sides of its rim for the purpose of receiving the steel tape 106 and changing its direction to that of a horizontal line parallel to the motion of the typewriter carriage. On vertical pins held in projections of side frame 1 are also loosely mounted two similar horizontal rollers 177 and 178 having flanges on the sides of their rims, for the same purpose. On the outer face of the side frame 1, are fixed two parallel horizontal guides 182 and 183. (Fig. 1.) Between the horizontal guides is mounted a movable slide 184, carrying a short stud 181, projecting to the right, and on this stud is loosely mounted a larger rimmed wheel 180, (Figs. 2 and 11) adjustable by movement of the slide in the guide ways through actuation of a screw 186 in an abutment 185 to take up any slack in the steel tape which passes around the wheel.

The endless steel tape passes around the rewinding ring 97, its holes receiving the pins therein, extends forward from its top around the horizontal roller 176, passing parallel to the movement of the typewriter carriage across the mechanism and directly in the rear of the bar 159 (Figs. 1, 2 and 3) movable with the typewriter carriage, thence around rimmed roller 177 to the rear, over the rimmed wheel 180, coming forward from lower face of the latter, around rimmed roller 178, changing its direction to return parallel to the motion of the typewriter carriage across to rimmed roller 179, and thence to the lower face of the rewinding ring 97. A sleeve 161$^a$ is adjustably mounted on the bar 159, being held in place by screw 161, and is provided with a rearwardly projecting pin or finger 161$^b$ Fig. 3 at the level of the upper stretch of the tape. The pin is adapted to project through any of the holes in the tape and normally does extend through one of them, whereby movement of the carriage drives the tape.

As the typewriter carriage moves from right to left, step by step, it rotates the rewinding ring 97 through the endless tape 106, thereby drawing the pawl 100 inoperatively over the face of the rim of disk 80; but, in moving from left to right, to bring the sheet in position to receive a new line of writing or figures, the ring or drum 97 is rotated in the opposite direction, that is, to the left (as seen in Fig. 16) and the pawl is caused to engage the single tooth 83 of disk 80, turning the latter to rewind spring 78 and restore any power that may have been expended during the previous trip of the carriage. The size of the rewinding ring is such that in the traverse of the typewriter carriage, which is about $7\frac{2}{10}$ inches, the ring is never turned through quite its whole rotation. The motion of the disk 80, having the ratchet tooth 83 takes place only when the power is expended, that is, when the figures are written, and its motion rotarily, to write a line of figures, is only a fraction of one revolution, consequently the pawl 100 is drawn backward by the rotation of the rewinding ring, constantly out of engagement and in advance of the single ratchet tooth 83, thereby keeping its point in readiness, upon the return of the carriage, to enter the notch adjacent to the ratchet tooth in disk 80, for rotating the latter to wind the spring through sleeve 81 and hook 82.

*Movement of the number-wheels.*—Referring to Figs. 3—4—5—6 and 7, each number-wheel includes a pinion 127, having a sleeve 128 projecting to its left, and loosely mounted on shaft 45, which is journaled at its right hand end in side frame 1, and at its left hand end in the partial side frame 3, as hereinbefore described, and inclosed in a casing through an opening 129ª in which the numbers are visible. The opening serves as an indicator by which the results are to be read. The numbers are made to appear on the face of a disk 129, which is mounted on sleeve 128, being caused to rotate therewith by means of a feather 128ᵇ, and carries, pinned to its left hand side, a plain disk 130 with two pinion teeth 131 projecting laterally from its left side, and a single tooth-space cut out of it between the two teeth. This combined number disk is slid upon the sleeve 128 to a shoulder 128ª, the object of which is to provide a space between the pinion 127 and the number disk to permit a vibratory movement of a slide or carrier 137. The slide is provided at its center with an opening sufficiently large so that, in its movement, it will not contact with the number wheel. On the left hand portion of the sleeve 128, projecting beyond disk 129, is loosely mounted a pinion 132, of which the teeth are spaced to correspond with the two teeth 131 projecting from the disk 130, the two running closely side by side. Between adjacent pinions 127 and 132ª fixed pinion 133, having the same number of teeth as the number-wheel, is splined to shaft 45, so as to rotate therewith.

At the rear of shaft 45 and parallel to it is a bar 134, having arms projecting forward. These arms are slotted, the width of the slots being sufficient that carrying wheels 135, mounted upon a small shaft 136, may be contained and rotate freely within them. The carrying-wheel consists of a six tooth pinion with the right hand ends of three in its alternating teeth removed for a distance of about one-third their length, leaving but three teeth at its right hand end. The carrying-wheel is directly in the rear of pinions 130 and 132 and in proper position that its six teeth may correctly mesh with the two teeth on 131 of disk 130, and all the teeth of the loosely mounted pinion 132. Two of three full-width teeth of the carrying-wheel rest upon the periphery of the disk 130, which prevents rotation of the pinion until the space between the two teeth 131 (by the rotation of the number-wheel to the right of the carrying-wheel) is opposite one of the full-width teeth. At that point, if the number-wheel continues to rotate, the two teeth 131 at the left of disk 129, contacting with two of the six teeth at the central portion of the carrying-wheel, rotates the carrying-wheel one-third or two teeth, and as the left hand end of the carrying-wheel meshes with the loosely mounted wheel 132, that wheel is rotated in either direction two teeth, or one-tenth of its whole rotation.

It will be noticed that as the teeth at the left hand end of the carrying wheel are in constant mesh with the loosely mounted wheel, and that as two of the three teeth at the right rest upon the disk 130, it effectually locks the wheel 132 from rotation except at the point where the number wheel is turning, to bring at its view point 0 from 9, or the reverse.

There is a slide 137 for each of the number wheels, each of which is mounted at its top and bottom in parallel bars 138 and 139 respectively. It is provided with an opening at its center so large that in its upward or downward motion it will not contact with the sleeve 128 which it surrounds. The slide is in the same plane as the space between pinion 127 and number disk 129 but does not contact with either. Around the opening at its center, there is a raised circular rim 140, on which is mounted, flat against the vertical slide, a thin pinion 141 which is designed as an idler, for the purpose of meshing with the teeth of the two connecting wheels 142 and 143, which are loosely mounted on stud screws 144 and 145, fixed to the side above and below the shaft 45. At the bottom of the vertical slide there is a small wheel 150 loosely mounted on a pin 151. This small wheel rests upon the rim of a large cam-wheel 152, except when in the rotation of wheel 152 it is adjacent a single space in the rim thereof, when, by the pressure of the spring 147, mounted on parallel rods 148 and 149, it moves downward. The upper wheel 142 meshes with the idler 141 constantly, and is so formed being approximately as wide as the combined widths of pinions 141—127—133, that, if it moves with the slide downward, its pinion teeth will engage both the power fixed wheel 133 and the pinion 127 of the number wheel connecting them together. If the number wheel shaft 45 be rotated during this connection, the number wheel will be rotated with the shaft.

The connecting wheel 143 always meshes with the idler 141 and normally is in mesh with the pinion 127 of the number wheel and the loosely mounted wheel 132, being grooved between its ends so as to skip the intermediate power wheel 133, so that if the wheel 132 be rotated one-tenth by the carrying wheel, it will communicate the rotation of one-tenth to the next left hand wheel; but, if the slide be depressed, connecting a number wheel with its power wheel 133, through the pinion 142 the connection of that wheel 127 with the wheels to the right is broken, allowing any number wheel of which the carrying connections is thus broken to rotate freely in either direction as the first right hand wheel of any train in calculating wheels without disturbing the position of any wheel to its right.

In order to take up backlash between the tens-carrying wheels, the number disks and the connecting pinions, and to insure complete operation of the extreme left hand disk when a long series is simultaneously operated by turning a disk at the right, I provide auxiliary actuators or accelerators for the carrying wheels 135. The accelerators are shown as spring wires or rods 135ª extending across each pinion 135 and engaging two non-adjacent teeth of the latter, although other yielding devices than wires may be used, the only essential being that such devices shall have points substantially in line adapted to engage the pinion teeth as described. In order that this engagement with non-adjacent teeth may take place, the intermediate teeth are provided with slots, through which the accelerators may extend without engagement. The pinions are therefore constructed, as shown in Fig. 35, with their alternate teeth slotted at 135ᵇ and the other teeth unbroken throughout their entire width. The accelerators 135ª are carried by holders 135ᶜ pivotally mounted one of the frame tie rods, as 9, each of which has an arm 135ᵈ adapted to be engaged by a protuberance 137ª on the sliding carrier 137 when the latter is depressed to connect a number wheel with its driver 133. This has the effect of pressing the accelerator against the pinion 135 lying between the number disk which is thus put in driving connection, and the loose wheel 132 at the left thereof.

The accelerator engaging a pinion 135 is first pushed away when the pinion begins to rotate, but, after the rearward unslotted tooth has passed by the dead point, or line in which pressure is exerted by the accelerator, the latter becomes operative and drives the pinion forward ahead and independent of the number disk teeth 131 until the tooth engaged thereby reaches the limit of its movement and strikes the face of disk or shoulder 130. By means of the accelerators, the carrying pinions are driven through to the limits of their motion and all backlash is taken up. Without them the pinions would lag behind, on account of unavoidable looseness, so that the left hand number disk of a long train would be moved through only a part of the necessary travel to carry from 9 to 0, or vice versa, and in some cases would not be moved at all.

Where several columns of figures are to be written, as one column for listing the amounts of bank checks, a second column for the discounts or the exchange, and a third column for collection charges, a greater number of number wheels than shown in Figs. 2, 5 and 6 will be required to show the results of the several columns, and, as the space between the side frames is limited, a number wheel, taking less space laterally on the shaft must be employed. Figs. 32, 33 and 34 show a modification for this purpose. Here the vertical slides are removed thereby saving the space between each number wheel and its attached pinion 127 required for them, and in place of the slides, the connecting wheels 142 and 143 together with the idler wheel 141, are mounted upon a rocking three armed lever 193, loosely mounted on a shaft 192, directly in the rear of each of the number wheels. The power wheel 133, which was fixedly mounted by the side of each number wheel, remains fixedly mounted on shaft 45, and by its side is a loosely mounted connecting wheel 189, its teeth meshing with the pinion 127 on the side of the number wheel. All the number wheels are removed from shaft 45, and are loosely mounted on a shaft 188, fixed in side frames 1 and 3. Fixed to the side of connecting pinion 189 is a pinion 190 the same size and adjacent the fixed power wheel 133.

The rotation of shaft 45, from the impulse of the spring and its limitation of rotation through the nine controlling mechanisms, is the same as before described. The three armed rocking lever 193, loosely mounted on shaft 192, has near the end of its right hand arm a small wheel 194, pivotally mounted on a screw 195. The face of the wheel 194 rests on the face of one of the circular cams 152, and the arm is thus held upward against a lateral bar 196, held by side frames 1 and 3, until such time as the recess 152ª in the face of each circular cam 152 is adjacent the small wheel 194, when it is forced downward by spring 197 (held by bar 196), thus causing a rocking motion of the lever 193. At the end of the upper arm of lever 193 is pivotally mounted a connecting pinion 143 which normally connects the idler 132, on the left hand side of a number wheel with the pinion 127 on the right hand side of the next adjacent number wheel to the left, in order that, if tens are to be carried, the motion may be communicated from one wheel to the next. Near the end of the lower arm of lever 193 is pivotally mounted a pinion 142, normally out of connection but designed to mesh with the power wheel 133 and the adjacent pinion 190, thereby connecting the two.

When the three armed lever 193 is rocked downward, the pinion 143 is rocked out of mesh, destroying the connection between the number wheel, which is to be rotated to express a new value, with all of the number wheels to its right (thereby making it as the first wheel in any train of indicating wheels) and the pinion 142 is rocked into mesh, connecting the power wheel 133 with the adjacent pinion 190. If the shaft 45 be rotated during this connection, the number wheel on shaft 188, being meshed with connecting wheel 189 and that wheel being fixed to the side of pinion 190, the number wheel will be rotated the proper distance to express the changed value according to the number selected.

Near the center of the three armed lever is a raised cylindrical flange 191, loosely mounted on which is the idler pinion 141, which meshes with both pinions 142 and 143. Its side is flat against the three arm lever causing a slight friction which prevents any loose motion, either of it or pinions 142 and 143. Thus when either of the pinions rotate, both of the pinions 142 and 143 and the idler 141 rotate a corresponding number of teeth, and, as one or the other of the pinions is constantly in mesh in its respective connection, the wheels are always in correct position, when the rocking of the lever occurs, to accurately enter the teeth of the wheels to be connected. As the three-armed levers and connecting wheels in this form are placed directly back of and in the plane of the number wheels, the bar 134 and the carrying wheels 135 are removed to a position directly above the number wheels. In this form of mechanism, the arm 135$^d$ of the holder 135$^c$, which carries the auxiliary actuator or accelerator 135$^a$, is arranged to engage one of the arms of the three-armed lever 193. Similarly to the other arrangement, when lever 193 is rocked to connect pinions 133 and 190 together by pinion 142, for driving a number disk, the accelerator immediately at the left of this disk is pressed against its pinion 135.

The cams 152 are fixed on a shaft 153, journaled in inside frames 1—2, and operated by the typewriter carriage through an adjustable rack 161$^c$, which is formed upon the sleeve 161$^a$ previously described, slidably mounted on a horizontal bar 159 which is carried by two arms 160, projecting to the rear from the typewriter carriage and which slide on the fixed bar 160$^a$, which is a part of the machine. The rack is arranged to mesh with a gear segment 158$^a$ on a cross shaft 157, which shaft at its rear end carries a spiral gear wheel 158, meshing with a spiral gear 154, fixedly mounted on shaft 153. In Fig. 32 bevel gears 198—199 are substituted for the spiral gears. During a portion of the travel of the typewriter carriage, the rack 161$^c$ is separated from the gear segment 158, but, when it comes into engagement with the latter, it rotates the same step by step as the carriage is moved, while the keys are operated and the shaft 153 is correspondingly rotated. It will be observed that the circular cams, each having a recess cut from its face, are equal in number to the slides 137 or the levers 193, and that they are spaced laterally so that each comes in the plane of one of the slides and in such position that its face or rim contacts with the loosely mounted wheels 150 at the bottom of the slide or the wheel 194 of a lever, thereby keeping the slides raised until the tooth space is moved opposite the small wheel, when the slide operated by spring 147 is pressed downward. They are arranged rotarily as to the tooth spaces, in a generally helical line about the shaft so that no two of the recesses are in alinement. The cams being arranged on the shaft in the manner above described, as the shaft is rotated, it is evident that the recesses will come directly under the wheels on the slides successively. The recess of the left hand cam first comes opposite the wheel of the left hand slide, allowing it to descend, thereby throwing in the driving connection of the first number wheel and disconnecting the carrying connection with the next wheel at the right, as previously described, so that, if a number be typewritten in the million column, the power wheel (being rotated as many tenths as the units of the selected number) will rotate the first number wheel the proper distance to record that number. Further rotation of the cam shaft and cams throws into driving gear the successive number disks to the right and throws out their right hand carrying connections in the same manner while restoring the previously depressed slide and again completing the carrying connection at the left.

In typewriting a line of figures, it is usual to place a comma between the figure representing the millions and those representing the hundreds of thousands, and in order that the second number wheel may not be connected with the power wheel while the carriage is at this position, the recess in the next right hand cam is spaced angularly, twice as far from that of the first cam as the angular distances between the depressions governing the number wheels for the hundreds of thousands, the tens of thousands and the units of the thousands columns, which are spaced equally. Between the thousands column and the hundreds column there is usually a comma written; and again between the dollar (or units) column and the tens of cents (or tenths) column, there is written a period, and the same arrangement of spacing is provided as for the space between the millions and the hundreds of thousands as above described. Thus the point on the sheet, at which numbers to be added or subtracted may be written, is determined by the location of the rack; while the position of the numbers in line, whether adjacent or separated by commas and period, or in groups of three, more or less, and the spaces between such columns, are arranged so that a number typewritten at a given place may be recorded upon the proper number wheel, by the rotarial distance between the depressions on the several circular cams. There is also such a space between the depressions at the position of rest of the segment gear 158, before the rack engages it and after the rack leaves it, in either direction, in order that no number wheel may be rotated by the writing of other numbers than those required to be added or subtracted. This arrangement of cam depressions is shown in Figs. 1 and 31. While it is necessary that the depressions be separated in multiples of the distance moved with each step of the carriage, any desired arrangement may be adopted whereby to determine the spacing between the figures written. This spacing may be uniform as 1 2 3 4 5 6 7 8 9 or one or more spaces of great width may be left to permit writing in separated parallel columns, one for the amount of checks listed and a second column for the collection charges; or a column for weight and a second column for tare; or as in the example of checks and collection charges, a third column might be written expressing the net result; and all three results will be shown upon the number wheels, any collective number of them being used by the tooth spaces in the faces of the cam wheels, arranged adjacent or distanced circumferentially from each other. Again, if it were desired to write figures from one side of the paper to the other, the tooth spaces could be adjusted to write and add them as a single column, or in two, three, four or more columns by meshing pinions 187 (shown in Fig. 31) or intermittent gears, fixed on the cam shaft 153, with the pinion 104 fixed to the side of the rewinding ring, which is rotated step by step with the lateral motion of the typewriter carriage. An arrangement for indicating the positions of six parallel columns of figures, using nine number wheels with two spaces for commas and one space for a period, twelve spaces in all, is shown in Fig. 13, being a representation of the space indicator on a Remington machine, together with an index made upon or attached to it to show where the columns may be written. In this arrangement the nine cam wheels must take twelve steps in one rotation of the cam shaft.

If a twelve tooth pinion 187, fixed to the projecting left hand end of the cam shaft 153, be meshed with the teeth of the pinion 104 on the side of the rewinding ring (see Fig. 31), the lateral movement of the carriage, step by step, through its connection by the endless steel tape 106, will rotate the pinion 104 exactly one tooth to each step, thus turning the cam shaft intermittently one rotation with twelve stops at each of the six columns indicated (in all seventy-two positions of the carriage) and through the arrangement of the single depressions in the rim of the cams, as has already been explained, the number wheels, by the downward movement of the slides, will be successively connected with the respective power wheels at their sides for rotation, of which the amount depends on the selection of the number key depressed. Thus any number of wheels, more or less and different number of columns, in different positions may be adjustably located either by the number of teeth on one or more sliding racks on rod 159, or through pinion wheels of different number of teeth on the cam shaft 153, meshing with pinion 94. If a connecting pinion 187 be used to impart motion to the cam shaft, the segment gear 158, on the cross shaft 157, may be removed, or the spiral gear 154 may be slid along the cam shaft out of mesh with spiral gear 158, as its use as shown is to provide for one column of figures only. Two or more racks can be mounted on lateral bar 159 and adjusted for as many columns, at the desired locations on the paper.

To discontinue the operation of the calculating mechanism when desired, and to prevent its action when the "upper case" characters (on the same type bars as the several members) are written, a lateral rocking shaft 203 (Fig. 1) is provided, mounted at its ends at side frames 1 and 2. At its right hand end it has an arm crank 201 with a projecting handle 202 for rotating by hand, and a slight projection on its under side to enter a small hole 202ª in the side frame 1, to hold it in a fixed position when moved to the left, to discontinue the operation of the mechanism. Fixedly mounted on rocking shaft 203, directly in front of each vertical rod 23, is a short arm having a projection 207 at its end, designed, when moved rearward by actuation of the shaft, to contact with a forward projection 208, on each of the vertical rods 23, to prevent upward motion of the latter, thus preventing any escape motion of the control shaft 33 and the recording of any number on the number wheels. At the left hand end of the rocking shaft, outside the side frame 2, there is a fixed arm with a pin 204 at its upper end, which passes through and normally is in contact with the forward end of an elongated slot 206, in a link bar 205. This link bar extends forward, sliding on the upper side of the table of the typewriting machine, its forward end, in the form of a hook, passing over the front bar on which the front wheels of the typewriter carriage travels laterally across the machine. Whenever the "upper case" characters are printed, this rod, which is mounted upon an upright lever in the Remington machines, is moved backward to change the position of part of the typewriter carriage, and its backward movement, through link 205 and pin 204, rocks the shaft 203 forward, thereby bringing the nine short arms 207 in contact with the forward projections 208, thus preventing the upward movement of the rods 23 and the actuation of the calculating mechanism.

I claim:—

1. A calculating mechanism, comprising movable figure-bearing members, a driven actuator therefor, manually-operated means representing a series of numbers, and a series of relatively movable escape devices mounted on the actuator and controlled by said manually-operated means adapted to permit step-by-step movements of said actuator proportional to the numerical values of the several manually-operated means.

2. A calculating mechanism comprising movable figure-bearing members, a driven actuator therefor, control devices representing a series of numbers, and a series of relatively movable escape devices, each controlled by one of said devices and adapted to be held stationary when one of the said devices is operated, to permit a movement of the actuator proportional to the value of the number represented by that device.

3. A calculating mechanism, comprising movable figure-bearing members, an actuator therefor, escape members mounted on said actuator, one of which is fixed and another of which is relatively movable thereon in the direction of movement thereof through a limited distance having a definite proportion to a value employed in calculation, and escape devices operated in unison and arranged to hold either of said escape members from movement while releasing the other of such members.

4. A calculating mechanism, comprising movable figure-bearing members, a driven actuator therefor, manually-operated means representing a series of numbers, and a series of escape devices carried by said actuator, each controlled by one of said manually-operated means and having an amount of movement relative to the actuator in the direction of movement of the latter proportional to the value of the number represented by its controlling means, each said device when one of the manual means is operated being held stationary and adapted to permit movement of the actuator by such amount.

5. A calculating mechanism, comprising movable figure-bearing members, a driven actuator therefor, an arrester for holding the actuator stationary, a plurality of manual means representing a series of numbers operable to cause registration of different numbers, a series of escape devices with respect to which the actuator has varying amounts of movement corresponding to the values of the several numbers, and controlling means, each arranged for actuation by one of said manual means to engage and hold stationary an escape device and disengage the arrester from the actuator, whereby the latter is enabled to move and carry a number-bearing member through a distance corresponding to the particular manual means operated.

6. A calculating mechanism, comprising movable figure-bearing members, a shaft connected to move the same, means normally tending to rotate the shaft, escape devices connected to the shaft, control members representing a series of numbers, and detents controlled by said control members arranged to permit movement of the shaft, when any control member is operated, proportional to the value of the number represented by such member.

7. A calculating mechanism, comprising movable figure-bearing members, a shaft connected to move the same, means normally tending to rotate the shaft, fixed and movable escape devices connected to the shaft, control members representing a series of numbers, and detents controlled by said control members arranged to release the fixed escape device and engage a movable escape device to permit movement of the shaft, when any control member is operated, proportional to the value of the number represented by such member.

8. A calculating mechanism, comprising movable figure-bearing members, a shaft connected to move the same, means normally tending to rotate the shaft, a series of escape devices connected to the shaft, of which one is fixed, while between the others and the shaft various amounts of relative movement proportional to the several numbers to be calculated are permitted, control members representing a series of numbers, and detents controlled by said control members arranged to release the fixed escape device and engage a movable escape device to permit movement of the shaft, when any control member is operated, proportional to the value of the number represented by such member.

9. A calculating mechanism, comprising movable figure-bearing members, a shaft connected to move the same, means normally tending to rotate the shaft, an escape wheel fixed to said shaft, a detent normally engaged with the fixed wheel to hold the shaft stationary, a series of loose escape wheels on the shaft with respect to which the latter is relatively movable, manually-operated members representing a series of numbers, a plurality of detents, each operable by one of said manual members to engage one of the movable wheels and to release the detent from the fixed wheel, and coöperating stops on the shaft and loose wheels to limit the relative movement thereof, said stops for the various wheels being differently spaced about the axis of the shaft proportionally to the several numbers.

10. A calculating mechanism, comprising movable figure-bearing members, a shaft connected to move the same, means normally tending to rotate the shaft, an escape wheel fixed to said shaft, a detent normally engaged with the fixed wheel to hold the shaft stationary, a series of loose escape wheels on the shaft with respect to which the latter is relatively movable, manually-operated members representing a series of numbers, a plurality of detents, each operable by one of said manual members to engage one of the movable wheels and to release the detent from the fixed wheel, coöperating stops on the shaft and loose wheels to limit the relative movement thereof, said stops for the various wheels being differently spaced proportionally to the several numbers, and yielding means tending to hold the shaft and fixed wheels at one of the limits of their relative movement.

11. In an apparatus of the character described, a shaft, means tending to rotate the shaft, an escape wheel loosely mounted thereon, coöperating stops on the wheel and shaft limiting the relative rotation thereof, a spring engaged with the shaft and wheel tending to bring and retain them at one of the limits of their relative movement, and means for alternately arresting and releasing the wheel and shaft respectively, whereby the latter is enabled to advance step-by-step.

12. In an apparatus of the character described, a shaft, an escape wheel loosely mounted thereon, coöperating stops on the wheel and shaft limiting the relative rotation thereof, a spring engaged with the shaft and wheel tending to bring and retain them at one of the limits of their relative movement, means tending to rotate the shaft, a displaceable detent for arresting the shaft, and a movable detent adapted to engage and hold the escape wheel while the first detent is displaced, whereby the shaft is enabled to rotate until the second limit is reached.

13. In an apparatus of the character described, a shaft, means tending to rotate the same, fixed and loose escape wheels thereon, stops limiting the relative rotation of the shaft and loose wheel in both directions, a spring tending to hold the same at one of their limits, and detents for the wheels movable first to engage the loose and release the fixed wheel, and then to engage the fixed and release the loose wheel, whereby first the shaft and then the loose wheel are enabled to turn through the permitted distance.

14. In an apparatus of the character described, a shaft and a loose wheel thereon, two stops on one and an intermediate stop on the other, limiting their relative rotation, a spring connected both to the shaft and the wheel tending to hold them with the stop of one in contact with one of the stops of the other, means tending to rotate the shaft, and displaceable detents for the shaft and wheel, one of which is adapted to be released while the other is engaged.

15. In an apparatus of the character described, a shaft, means tending to rotate the same in a given direction, a wheel loose on the shaft, a spring tending to rotate the wheel relatively to the shaft in the same direction, coöperating stops limiting the rotation of the wheel with respect to the shaft, and of the shaft with respect to the wheel, and displaceable detents for the shaft and wheel arranged to alternately release one and engage the other, whereby the shaft is enabled to turn step-by-step.

16. In an apparatus of the character described, a shaft, means tending to rotate the same in a given direction, a wheel loose on the shaft, a spring tending to rotate the wheel relatively to the shaft in the same direction, detents adapted to engage alternately the shaft and wheel to hold stationary first one and then the other, and coöperating stops limiting the rotation of the wheel with respect to the shaft when the shaft is held, and of the shaft with respect to the wheel when the wheel is held.

17. A calculating machine, comprising figure-bearing members, an actuator shaft connected to move the same, means tending to rotate the shaft in a given direction, an escape wheel fixed thereon, a detent holding the same and displaceable, a series of wheels loose on the same, a plurality of detents adapted to engage the loose wheels, one to each and to displace the first detent when so engaged, manually-operated devices controlling said last detents, each operable for calculating a different number, springs tending to turn the loose wheels about the shaft in the direction of rotation of the latter, and coöperating stops on the loose wheels and shaft limiting the rotation of each with respect to the other and differently spaced for the several wheels to correspond with the values of the several numbers, whereby when any loose wheel is engaged by its detent the shaft is permitted to rotate and advance a figure-bearing member by an amount corresponding to the number of the particular controlling member operated, and when the wheel is released, it is adapted to turn the same amount on the shaft.

18. In a calculating machine, having a series of figure-bearing members, a shaft by which they are moved, and a manually-controlled actuating shaft movable in one direction by amounts proportional to numbers to be calculated, the connections for moving the figure-bearing members to perform either addition or subtraction consisting of gearing communicating motion in either direction from the second to the first shaft, including fixed and oppositely-moving loose pinions on one of the shafts and an idler constantly in mesh with the fixed pinion and movable into gear with the loose pinions alternately.

19. In a calculating machine, having a series of figure-bearing members, a shaft by which they are moved, a manually-controlled actuating shaft movable in one direction by amounts proportional to numbers to be calculated, the connections for moving the figure-bearing members to perform either addition or subtraction consisting of gearing communicating motion in either direction from the second to the first shaft, including fixed and oppositely-moving loose pinions on one of the shafts and an idler constantly in mesh with the fixed pinion and movable into gear with the loose pinions alternately, and a handle connected to the idler for shifting the same.

20. In a calculating machine, having a series of figure-bearing members, a shaft by which they are moved, and a manually-controlled actuating shaft movable in one direction by amounts proportional to numbers to be calculated, the connections for moving the figure-bearing members to perform either addition or subtraction consisting of gearing communicating motion in either direction from the second to the first shaft, including fixed and loose pinions on opposite sides thereof on the first shaft, driving pinions on the second shaft geared to turn said loose pinions oppositely, and an idle pinion in mesh always with the fixed pinion and movable into mesh with either of the loose pinions.

21. A calculating machine, comprising a series of loosely-mounted figure-bearing disks, a driving shaft, and a carrier adjacent each disk on which are mounted a pinion for connecting the disk with the shaft and a second pinion for making carrying connection with the adjacent right-hand disk, means for moving the carrier so that only one of said pinions is operatively connected at any time, and a connection between said pinions preventing displacement of the inoperative one, so that each is always ready for correct engagement.

22. A calculating machine, comprising a series of loosely-mounted figure-bearing disks, a driving shaft, a carrier adjacent each disk having a pinion for effecting driving connection from the shaft to the disk, and a second pinion for making carrying connection with the adjacent right-hand disk, said pinions being connected so as to be always ready for correct engagement, and means for shifting said carrier to bring one of said pinions into operation and simultaneously move the other out of operation.

23. A calculating machine, comprising a series of loosely-mounted figure-bearing disks, a driving shaft, pinions fixed thereto equal in number to the disks, a carrier adjacent each disk, a pinion mounted on the carrier adapted to connect a disk with its respective fixed pinion, a second pinion mounted on the carrier adapted to make connections for carrying from one disk to the next, the carrier being movable to place one of said pinions in and remove the other from operation, and connections between the pinions for retaining them in definite relationship, whereby each is always in readiness for correct operative engagement.

24. A calculating machine, comprising a series of loosely-mounted figure-bearing disks, a driving shaft, pinions fixed thereto equal in number to the disks, a carrier for each disk, a pinion mounted on the carrier adapted to connect a disk with its respective fixed pinion, a second pinion mounted on the carrier adapted to make connections for carrying from one disk to the next, the carrier being movable to place one of said pinions in and remove the other from operation, and an intermediate gear meshing with both of the pinions on the carrier to retain them always in correct relation.

25. A calculating machine, comprising a series of loosely-mounted figure-bearing disks, a driving shaft, pinions fixed thereto equal in number to the disks, a loose pinion at the left of each disk, a carrying wheel between the disk and pinion adapted to carry tens from the former to the latter, a carrier adjacent each disk, and pinions thereon, the carrier being movable to cause its pinions alternately to connect a disk with its respective fixed shaft-pinion, and to connect the same disk with the loose pinion of the disk at the right.

26. A calculating machine, comprising a series of loosely-mounted figure-bearing disks, a driving shaft, pinions fixed thereto equal in number to the disk, a loose pinion at the left of each disk, a carrying wheel rotatably mounted in a fixed position between the disk and pinion adapted to carry tens from the former to the latter, a carrier adjacent each disk, and pinions thereon, the carrier being movable to cause its pinions alternately to connect a disk with its respective fixed shaft-pinion, and to connect the same disk with the loose pinion of the disk at the right.

27. A calculating machine, comprising a driving shaft, a series of figure-bearing disks normally unconnected with said shaft, and means movable so as to put one of the disks in driving connection with the shaft and simultaneously disconnect said disk from the one at the right thereof.

28. A calculating machine, comprising a driving shaft, a series of figure-bearing disks normally unconnected with said shaft, and pinions adapted to be moved simultaneously alternately to connect a disk with the shaft for driving and with its right-hand neighbor for receiving tens carried from the latter, and vice versa.

29. A calculating machine, comprising a driving shaft, a series of figure-bearing disks normally unconnected with said shaft, and a movable carrier, pinions mounted thereon adapted by opposite movements of the carrier alternately to connect a disk with the shaft for driving and with a disk at the right to receive tens-carrying motion therefrom.

30. In a calculating mechanism, a series of figure-bearing disks, a drive shaft, pinions side by side connected with the drive shaft and a disk respectively, manually-operated means controlling the motion of the shaft for calculating numbers, and means for connecting said pinions, whereby to rotate the disk and register the numbers calculated.

31. In a calculating mechanism, a series of figure-bearing disks, a drive shaft, pinions side by side connected with the drive shaft and a disk respectively, manually-operated means controlling the motion of the shaft for calculating numbers, and a wide pinion movable into mesh with the first pinions for causing them to rotate together and actuate the disk and thereby register the numbers calculated.

32. In a calculating mechanism, a series of figure-bearing disks, a drive shaft, pinions side by side connected with the drive shaft and a disk respectively, manually-operated means controlling the motion of the shaft for calculating numbers, loose carrying members between the disks for receiving intermittent motion from their respective adjacent right-hand disks, pinion carriers, and pinions mounted thereon, each carrier being movable in one direction to put one of its pinions in engagement with the first pinions for causing them to rotate in unison and drive a disk, and in the other direction to put another pinion into connection with said disk and the right-hand adjacent carrying member.

33. In a calculating mechanism, a series of figure-bearing disks, a drive shaft, pinions side by side connected with the drive shaft and a disk respectively, manually- operated means controlling the motion of the shaft for calculating numbers, loose carrying members between the disks for receiving intermittent motion from their respective adjacent right-hand disks, pinion carriers, and pinions mounted thereon, each carrier being movable in one direction to put one of its pinions in engagement with the first pinions for causing them to rotate in unison and drive a disk, and in the other direction to put another pinion into connection with said disk and the right-hand adjacent carrying member, each carrier and its pinions being so arranged that only one of the pinions is in such engagement at one time.

34. A calculating mechanism, comprising a series of number disks, a drive shaft, pinions connected to the shaft and disks respectively and located in pairs side by side, loose pinions intermediate the disks, each driven intermittently by the disk at the right thereof, a movable carrier adjacent each disk, pinions mounted on the carrier arranged to engage the pair of pinions belonging to its particular disk, and to connect the disk with the intermittently driven pinion at the right thereof for receiving carrying motion, and automatic means for moving the several carriers successively to connect the disks in turn with the shaft and simultaneously discontinue the carrying connection with the disk at the right.

35. A calculating mechanism, comprising a series of number disks, a drive shaft, pinions connected to the shaft and disks respectively and located in pairs side by side, loose pinions intermediate the disks each driven intermittently by the disk at the right thereof, a movable carrier adjacent each disk, pinions mounted on the carrier arranged to engage the pair of pinions belonging to its particular disk, and to connect the disk with the intermittently driven pinion at the right thereof for receiving carrying motion, and automatic means for moving the several carriers successively first to connect the disks in turn with the shaft and simultaneously discontinue the carrying connection with the disk at the right and then to restore the carriers to normal position wherein the driving engagement is broken and the carrying connection made.

36. In combination with a typewriter and the carriage thereof, calculating mechanism, comprising a series of number disks, a drive shaft, pinions connected to the shaft and disks respectively and located in pairs side by side, loose pinions intermediate the disks each driven intermittently by the disk at the right thereof, a movable carrier adjacent each disk, pinions mounted on the carrier arranged to engage the pair of pinions belonging to its particular disk, and to connect the disk with the intermittently driven pinion at the right thereof for receiving carrying motion, and automatic means operated step by step by the movement of the typewriter carriage for moving the several carriers successively to connect the disks in turn with the shaft and simultaneously discontinue the carrying connection with the disk at the right.

37. In a calculating apparatus, a series of number-bearing disks, mechanism for turning said disks including driving connections adapted to be moved into and out of engagement with the several disks, cams normally holding said driving connections out of such engagement and each having a depression which allows the driving connection to come into engagement when adjacent thereto.

38. In a calculating apparatus, a series of number-bearing disks, mechanism for turning said disks including driving connections adapted to be moved into and out of engagement with the several disks, cams normally holding said driving connections out of such engagement and each having a depression, and resilient means engaging the driving connection and arranged to move a part thereof into said depression when the same is adjacent thereto, for causing such driving engagement.

39. In a calculating apparatus, having a series of number-bearing disks, and manually-operated members for causing registration thereby of numbers, the carrying means comprising pinions intermediate the disks for transferring intermittently motion of one to another, and auxiliary actuators engaging two non-adjacent teeth and passing through slots in the teeth of the intermediate pinions arranged to turn them additionally to the motion given by the disks.

40. In a calculating apparatus, a series of number-bearing disks, carrying pinions intermediate the same, driving connections, normally inoperative, for each disk, an auxiliary actuator for each carrying pinion adapted to advance the same a farther distance after it has been moved by a disk, and means for throwing a driving connection for a disk into operation and simultaneously pressing an auxiliary actuator against the carrying pinion operated by said disk.

41. In a calculating apparatus, a series of number-bearing disks, carrying pinions intermediate the same, driving connections normally inoperative, for each disk, an auxiliary actuator for each carrying pinion adapted to advance the same a farther distance after it has been moved by a disk, and carriers for the driving connections adapted to place each of the latter in connection with a disk, having provisions for bringing an auxiliary actuator into closer engagement with the carrying pinion driven by the disk so connected.

42. A calculating machine, comprising figure-bearing index members, a driver therefor, manually-controlled escape members for the driver, a spring having one end in connection with said driver, a member connected to the other end of the spring and manually rotatable in one direction to put the spring under tension, and an automatic stop for preventing rotation thereof in the other direction.

43. A calculating machine, comprising figure-bearing index members, a driver therefor, manually-controlled escape members for the driver, a spring having one end in connection with said driver, means for holding one end of the spring fixed, a loose member, and means for actuating said loose member periodically to put the spring under tension.

44. In a calculating apparatus, a sleeve, a coiled spring connected at one end thereto, an abutment for the other end of the spring, a rotatable member loosely mounted adjacent the sleeve and arranged to turn freely in one direction and to engage and move the sleeve to wind up the spring when turned in the opposite direction, a paper carriage, and means moved thereby engaged with said rotatable member to turn the latter in its spring-winding direction.

45. In a calculating apparatus, a spring, a rotatable disk engaged with one end of the spring, a normally fixed holder for the other end of the spring, a loose winder adapted to turn freely in one direction and to engage and turn the disk to wind up the spring, when turned in the other direction, a paper carriage, and means moved thereby engaged with said rotatable member to turn the latter in its spring-winding direction.

46. In a calculating apparatus, a spring, a rotatable disk engaged with one end of the spring, a normally fixed holder for the other end of the spring, a loose winder adapted to turn freely in one direction, said winder and disk having coöperating fixed and movable shoulders adapted to be engaged to turn the disk and wind up the spring when the winder is turned in the other direction, a paper carriage, and means moved thereby engaged with said rotatable member to turn the latter in its spring-winding direction.

47. In a calculating apparatus, a spring, a rotatable disk engaged with one end of the spring, a normally fixed holder for the other end of the spring, a loose winder adapted to turn freely in one direction and to engage and turn the disk to wind up the spring, when turned in the other direction, a driver loosely mounted adjacent the disk, and arranged to be moved by the disk when the latter is turned by the spring, a paper carriage, and means moved thereby engaged with said rotatable member to turn the latter in its spring-winding direction.

48. In a calculating apparatus, a spring, a rotatable disk engaged with one end of the spring, a normally fixed holder for the other end of the spring, a loose winder adapted to turn freely in one direction and to engage and turn the disk to wind up the spring, when turned in the other direction, a toothed driver loosely mounted adjacent the disk, a pawl carried by the latter and arranged to engage and move the driver when the disk is moved by the spring, a paper carriage, and means moved thereby engaged with said rotatable member to turn the latter in its spring-winding direction.

49. In a calculating apparatus, a spring, a rotatable disk engaged with one end of the spring, a normally fixed holder for the other end of the spring, a lose winder adapted to turn freely in one direction and to engage and turn the disk to wind up the spring, when turned in the other direction, a driving member fixed to the winder, a paper carriage, and means moved thereby engaged with said rotatable member to turn the latter in its spring-winding direction.

50. In a calculating apparatus, a spring, a rotatable driven member connected to the spring to be actuated thereby, figure-bearing members adapted to be moved by said driven member, a disk also connected to the spring and having provisions whereby it may be turned by hand to wind up the spring, and a stationary pawl to prevent movement of the disk by the spring.

51. In a calculating apparatus, a connected sleeve and disk, a spring coiled around the sleeve and connected at one end thereto, a normally fixed holder to which the other end of the spring is connected, a drum journaled loosely on the sleeve, a pawl and coöperating shoulder on the drum and disk arranged to engage and turn the latter to wind up the spring when the former is turned contrary to the tension of the spring, a paper carriage, and means moved thereby engaged with said rotatable member to turn the latter in its spring-winding direction.

52. In a calculating apparatus, a connected sleeve and disk, a spring coiled around the sleeve and connected at one end thereto, a normally fixed holder to which the other end of the spring is connected, a drum journaled loosely on the sleeve, a pawl and coöperating shoulder on the drum and disk arranged to engage and turn the latter to wind up the spring when the former is turned contrary to the tension of the spring, a pawl carried by the disk, a ratchet adjacent thereto adapted to be engaged and turned by the pawl when the disk is driven by the spring, a paper carriage, and means moved thereby engaged with said rotatable member to turn the latter in its spring-winding direction.

53. In a calculating apparatus, a connected sleeve and disk, a spring coiled around the sleeve and connected at one end thereto, a normally fixed holder to which the other end of the spring is connected, a drum having provisions for receiving and holding a band passed about the same and journaled loosely on the sleeve, a pawl and coöperating shoulder on the drum and disk arranged to engage and turn the latter to wind up the spring when the former is turned contrary to the tension of the spring, a paper carriage, and means moved thereby engaged with said rotatable member to turn the latter in its spring-winding direction.

54. The combination with a typewriter and the carriage thereof, of a calculating apparatus including a spring driver, winding means for the spring operated by the carriage on its return movements, figure-bearing index members, a series of cams, and means on said driver adapted to be connected for moving the cam to put successive index members in connection with the spring driver.

55. The combination with a typewriting machine and the shift mechanism and the keys thereof, of a calculating apparatus having number-bearing members, an actuator therefor normally stationary, escape detents operable by the keys to permit movement of the actuator, and stops operable by the shift mechanism to prevent operation of said escape detents when the keys are operated to write other characters than numbers.

56. The combination with a typewriting machine and the keys and shift mechanism thereof, of a calculating apparatus having number-bearing members, an actuator therefor normally stationary, escape detents spring operated upon depression of the keys to permit movement of the actuator, and stops operable by the shift mechanism to engage and prevent operation of said escape detents when the keys are operated to write other characters than numbers.

57. The combination with a typewriting machine and the keys and shift mechanism thereof, of a calculating apparatus having number-bearing members, an actuator therefor normally stationary, escape detents, levers connected thereto resting on the keys and adapted, when the latter are struck, to operate the detents to permit driving movement of said actuator, and stop arms operated by the shift mechanism to arrest operation of the detents when other characters than numbers are written by the number keys.

58. The combination with a typewriting machine and the number keys thereof, of a calculating apparatus having number-bearing members, an actuator therefor normally stationary, escape detents, levers connected thereto resting on the number keys and adapted, when the latter are struck, to operate the detents to permit driving movement of said actuator, a rock-shaft, and arms connected thereto adapted to engage and hold the detents from operation when the shaft is rocked.

59. The combination with a typewriting machine having keys for writing figures, of a separable calculating apparatus including number-calculating mechanism and operating members therefor, said operating members extending over and resting loosely upon the said typewriter keys when the calculating apparatus is connected with the machine and operable to actuate the calculating mechanism upon depression of said keys.

60. The combination with a typewriting machine having keys by which figures may be written upon a sheet, of a calculating apparatus adapted for detachable connection with the machine, and operating devices for the calculating mechanism of said apparatus mounted upon said apparatus and so arranged as to extend over and bear on the typewriter keys by simply attaching the apparatus to the machine.

61. In a calculating apparatus, numeral indicators, control devices corresponding to the nine digits, a power driven operating shaft for actuating the numeral indicators, and escape devices including members mounted on the shaft and respectively fixed thereto and movable thereon, controlled by the control devices and constructed to permit movements of said shaft respectively proportional in amount to the numerical values of the nine digits.

62. In a calculating apparatus number indicators, a series of number keys, a power driven actuating shaft for moving the number indicators, and escape devices controlled by the several number keys and connected to said shaft for permitting the latter to rotate through angles respectively proportional to the numerical value of the several number keys.

63. A calculating apparatus comprising control devices representing the several digits, number-registering devices bearing numerical indications, a power driven shaft for moving said number-registering devices, and escape mechanism for the said shaft, including disks each under the control of one of said control devices, whereby to be arrested and released and free to rotate relatively to the shaft, or to permit rotation of the latter through angles respectively proportional to the numerical values of the digits.

64. In a calculating apparatus having control devices representing the numbers of a series, number-registering indicators, a power driven shaft for moving said indicators, and escape devices respectively fixed and rotatable upon said shaft, the rotatable escape devices being each under the control of one of said control devices and being limited in its capacity for rotation to an amount proportional to the value of the number represented by its control device.

65. In a calculating apparatus having control devices representing the several numbers of a series and number-registering indicators, all of said control devices having the same extent of movement, a main shaft for actuating said indicators, and means including relatively fixed and relatively movable wheels on said shaft by which said main shaft is caused under the control of the said control devices to rotate through angles proportional to the numerical values of the numbers represented by the several control devices according to which of the control devices is actuated at any time.

66. A calculating machine comprising a series of loosely mounted figure-bearing disks, a driving shaft, a pinion for transmitting motion from the shaft to each disk movable into and out of connection, and means continuously in mesh with the pinion for holding said pinion, during such movement, so that it will be in position to mesh properly when brought into connection.

67. A calculating machine including in its construction a series of loosely mounted number-registering indicators, a driving shaft for moving said indicators and pinions for transmitting motion from said shaft to the several indicators independently movable into and out of driving connection, and means for so holding said pinions at all times that when brought into driving connection they may be always in position for correct mesh.

68. In a calculating apparatus, the combination of number-bearing disks operable to register numerical values, said disks being placed side by side, carrying devices comprising essentially toothed wheels arranged intermediate adjacent disks and adapted to mesh therewith, whereby to be moved by one disk and to move the adjacent disk, each of said carrying devices having its alternate teeth slotted, and auxiliary actuating springs adapted to occupy the slot of one of said teeth and to bear against the alternately adjacent teeth, whereby to serve as an auxiliary actuator for advancing the carrying device additionally to the movement given it by the disk wherewith it is engaged.

In testimony whereof I have affixed my signature, in presence of two witnesses.

EDWARD H. PALMER.

Witnesses:
A. C. RATIGAN,
ARTHUR H. BROWN.

Copies of this patent may be obtained for five cents each, by addressing the "Commissioner of Patents, Washington, D. C."